May 15, 1956 — G. A. LYON — 2,745,519
BRAKE DRUM AIR COOLING DEVICE
Filed Aug. 9, 1951 — 2 Sheets-Sheet 1
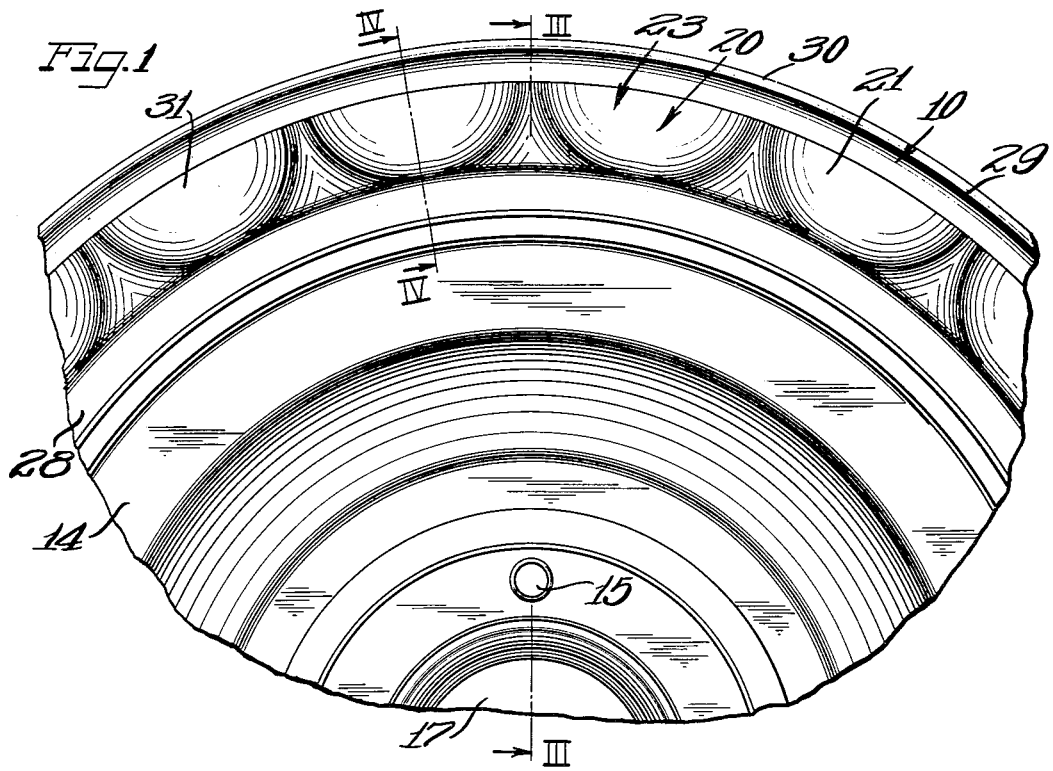
Fig. 1
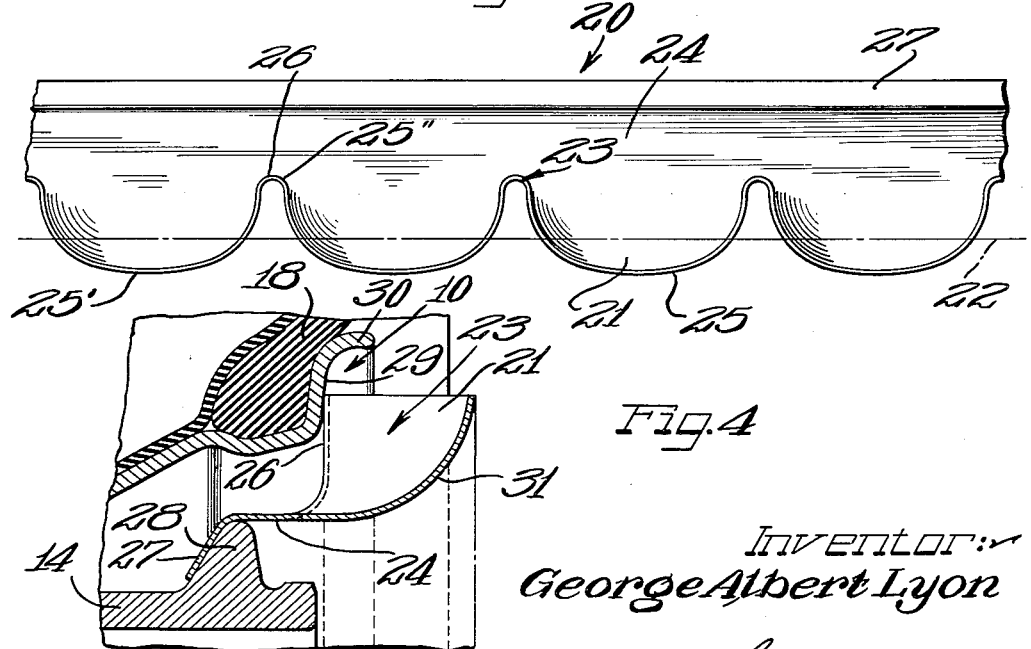
Fig. 2
Fig. 4
Inventor:
George Albert Lyon
by Attys May 15, 1956 — G. A. LYON — 2,745,519
BRAKE DRUM AIR COOLING DEVICE
Filed Aug. 9, 1951 — 2 Sheets-Sheet 2

Inventor:
George Albert Lyon

United States Patent Office 2,745,519
Patented May 15, 1956

2,745,519
BRAKE DRUM AIR COOLING DEVICE
George Albert Lyon, Detroit, Mich.
Application August 9, 1951, Serial No. 240,997
11 Claims. (Cl. 188—264)

The present invention relates to improvements in the cooling of brake drums in vehicle wheel assemblies, and more particularly concerns an expedient promoting the circulation of air around and over the surfaces of a brake housing or drum for cooling the housing of heat resulting during operation of the brakes in running of the associated vehicle.

During operation of a vehicle brake, a large amount of frictional energy is created between the brake shoe and the brake drum which must be dissipated as heat. Overheating and damage may result, especially where the brake drum is entirely encompassed by the tire rim and tire assembly, and the air about the brake drum tends to stagnate during running of the vehicle instead of circulating for cooling the drum.

An important object of the present invention is to provide an improved brake drum cooling expedient for avoiding the stagnation of the air about the brake drum and for promoting a vigorous, efficient cooling air circulation over and about the brake drum.

Another object of the present invention is to provide a brake drum cooling device which may be easily inserted into a conventional wheel structure and firmly held therein by engagement with the brake housing to permit removal of the tire rim without the necessity of removing the cooling device.

Another object of the present invention is to provide a brake drum cooling device which is radially symmetrical and, therefore, operative when the device is rotated and translated in either direction to drive air into and around the brake drum.

Another object of the present invention is to provide a brake drum cooling device which may be readily manufactured from a single piece of material.

According to the general features of the present invention there is provided in a vehicle wheel assembly including a brake drum and a wheel structure detachably secured concentric with the brake drum and having a tire rim encircling the brake drum in spaced relation and defining an air chamber between the tire rim and the brake drum, an air circulating promoting member comprising a ring mounted across the inner side of said chamber between the tire rim and the brake drum and having peripheral radially outwardly opening air scooping means thereon for driving air from the inner side of the wheel assembly through said chamber.

According to further features of the present invention, there is provided as an article of manufacture, a generally annular radially symmetrical brake drum cooling air circulator, said circulator comprising a sheet member having a body including radially outwardly opening air scoop means operative when the circulator is rotated and translated in either direction to drive air in a generally axial direction, the radially inner side of said circulator having a generally axially extending flange to engage about the inner portion of a brake drum for retaining engagement with the brake drum.

Other objects, features and advantages of the present invention will be readily apparent from the following detailed description of a preferred embodiment thereof taken in view of the accompanying drawings, in which:

Figure 1 is a partial inner side elevational view of a brake drum cooling device within the scope of the present invention mounted on a wheel structure, the pneumatic tire and tube assembly being omitted;

Figure 2 is a developed peripheral plan view of the cooling device shown in Figure 1;

Figure 4 is a fragmentary radial cross sectional view taken substantially along the line IV—IV of Figure 1.

As shown on the drawings:

Figure 3:
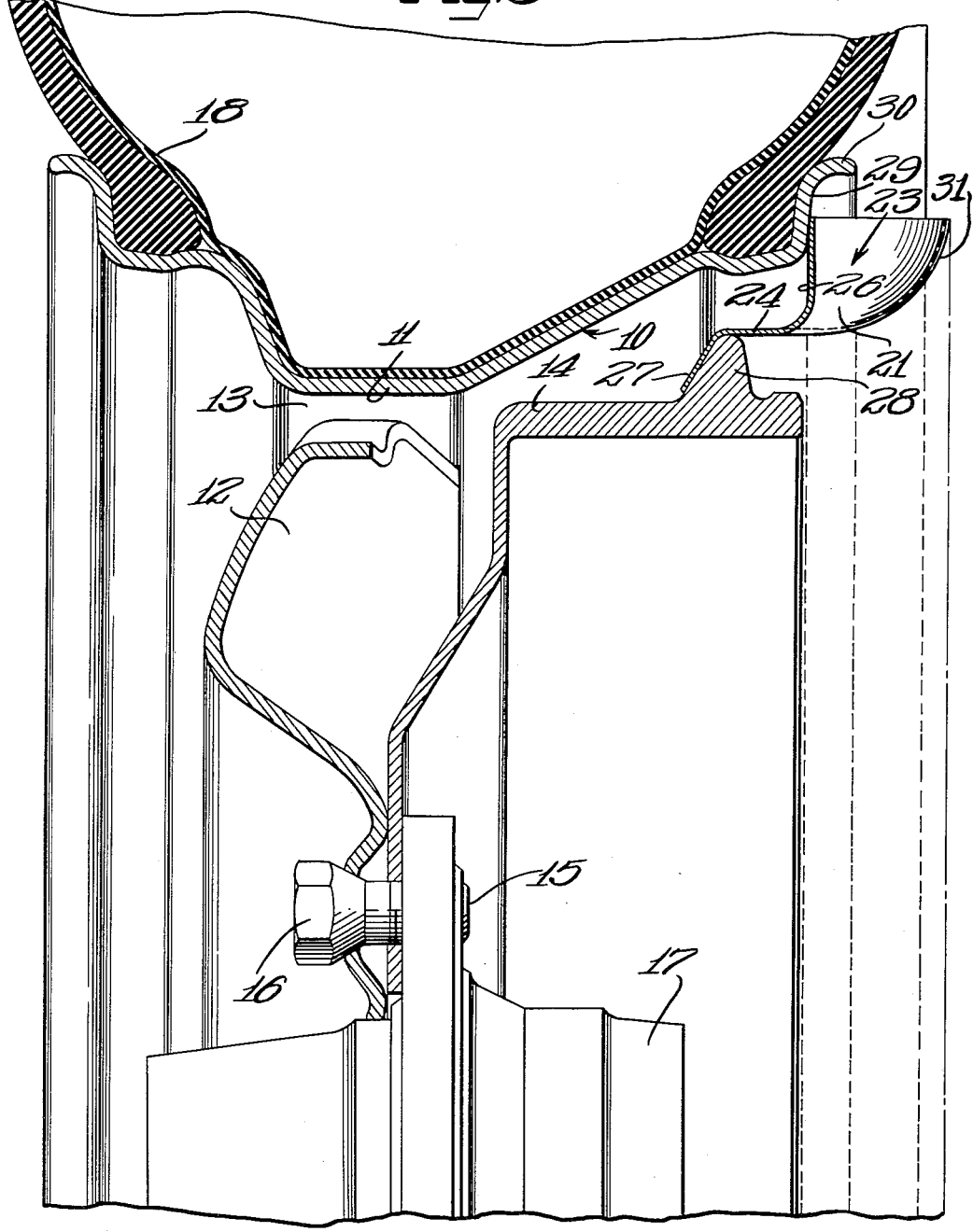
Figure 3 is an enlarged fragmentary radial cross sectional view taken substantially along the line III—III of Figure 1.

Referring particularly to Figures 1 and 3, the brake drum cooling device embodying the features of the present invention is adapted to be assembled with a vehicle wheel for cooling purposes. Such a wheel may include a multiflange, drop center tire rim 10 which is secured as by riveting or welding of a base flange 11 thereof to a load sustaining central body portion or spider 12. At appropriate intervals air circulation openings 13 are provided between the wheel spider and the tire rim base flange 11.

The wheel in use is secured to a brake housing or drum 14 as by means of bolts 15 and attachment nuts 16, the bolts 15 being seated in the axle assembly 17 for rotation therewith. In this association, the inner portion of the tire rim encompasses the brake drum 14 in spaced relation and defines therewith an air circulation space or chamber which, except for the air circulation openings 13, is closed at the outer side of the wheel by the wheel body 12. For cooling the brake drum 14 reliance is had upon circulation of air through the air chamber and the air circulation openings 13. However, due to the fact that the brake drum 14 is entirely encompassed by the tire rim and a pneumatic tire 18 carried by the rim and spreading axially beyond the side of the tire rim, movement of air past the wheel during operation of the vehicle tends to by-pass the brake drum 14 and as a result the air in the chamber about the brake drum tends to stagnate and it is heated enough so that there is danger of the brake drum overheating.

According to the present invention, the brake drum is positively cooled by forcing a circulation of air from the inner side of the wheel generally axially outwardly through the chamber between the brake drum and the tire rim and about the brake drum and out through the ventilation openings 13 in the wheel to the front or outer side of the wheel.

By the term "axially outwardly" is meant in direction of the axle outwardly toward the wheel referred to away from the center of the vehicle, from right to left in Figure 3 in respect to the left wheel there shown. "Inner side" of the wheel refers to the side of the wheel toward the center of the vehicle, the right side of the wheel in Figure 3.

The cooling circulation of air is diverted from the air which normally rushes past the brake drum and entirely by-passes the brake drum and actually tends to cause a vacuum about the brake drum. To this end, the air circulation promoting, brake drum cooling device 20 is mounted at the inner side of the wheel in substantially closing or covering relation to the inner side of the chamber defined between the tire rim and the brake drum and with air scooping cups 21 disposed about the periphery of said device to form a scalloped ring of cups or scallops 21 opening radially outwardly. It will be observed that these scallops or cups are radially symmetrical so as to operate equally efficiently for either direction of rotation and translation of the wheel. As seen in Figures 2, 3 and 4, the scallops or cups 21 project axially inwardly beyond the tire 18. The dot-dash line 22 in Figure 2 indicates the innermost axial extent of the tire 18. It will be observed that the portion of the scoops or cups 21 which projects inwardly beyond the tire extends generally radially outwardly so as to efficiently impel air into the brake drum cooling chamber for circulation there-through and exhaust to the ventilation openings 13 in the wheel, while presenting a curved back surface to air flowing thereagainst.

The brake drum cooling device 20 embodying the features of the present invention is preferably in the form of a sheet metal ring having a generally L-shaped construction, including a generally radially extending body 23 in which the scallops 21 are formed and an axially extending flange 24 at the radially inner edge of said radially extending body 23. The scallops may be formed in the body simply by a stamping operation. As seen in Figure 2, these scallops 21 are spaced closely together so that their radially outermost marginal edges define an undulating curve indicated by reference numeral 25, Figure 2. The curve 25 will be seen to be similar to an inverted epicycloid with alternate broad flat curve portions or wells 25' and sharp peaks or sharply peaked curve portions 25''. The axially outermost portion 26 of the air circulator body 23 extends radially outward from the flange 24.

In mounting the air cooler ring, a radially inwardly extending marginal flange structure 27 at the axially outer edge of the flange 24 is assembled against a radially outwardly extending annular rib or shoulder 28 on the brake drum 14 prior to the attachment of the wheel proper and then the wheel proper is secured to the brake drum and acts to retain the cooler ring in place, this being effected by engagement of the outermost radially extending body portion 26 of the body 23 by an inner axially inwardly facing terminal flange 29 of tire rim 10 with a firm thrust engagement which places the flange structure 27 under sufficient tension against the retaining shoulder rib 28 to prevent relative rotation between the cooler ring and brake drum. This places the ring to open into the air circulation space about the brake drum 14. Ample space may be provided between the body 23 and the tire rim terminal flange lip 30 to accommodate one or more wheel balancing weights. It will be apparent that the brake drum cooling device projects sufficiently inwardly beyond the terminal flange of the rim and the maximum inward bow of the tire side walls to intercept the slip-stream of air that flows past the wheel during forward travel of the vehicle.

As the cooler ring rotates with the wheel, the cups or scallops 21 opening generally in the direction of travel of the vehicle will scoop the air to flow outwardly from the cooler ring and into the drum cooling chamber and then exhaust in heated condition through the wheel openings 13. The cups 21 opening in the direction opposite to the direction of travel of the vehicle, generally, will present a streamline radially outwardly curved back surface 31 which will produce a minimum resistance to the forward travel of the vehicle. In this way, the brake drum is efficiently cooled.

Since the cups which are located at any instant of time on the upper rapidly traveling portion of the wheel will have a component of their tangential velocity, which results from the rotary movement of the wheel, added to the velocity of the vehicle as a whole, the velocity of these cups will be greater than the velocity of the vehicle in the forward direction. These cups will therefore tend to scoop air into the cooling chamber at an accelerated rate. Further, these cups are traveling in a tangential direction and tend to drive air tangentially as well as axially, thus tending to increase the amount of the cooling air moving around the brake drum circumferentially.

It will be understood that various modifications and variations may be effected without departing from the novel concepts of the present invention.

I claim as my invention:

1. In a vehicle wheel assembly including a brake drum and a wheel structure detachably secured concentric with the brake drum and having a tire rim encircling the brake drum in spaced relation and defining an air chamber between the tire rim and the brake drum, an air circulation promoting member comprising a ring mounted across the inner side of said chamber between the tire rim and the brake drum and including radially spaced portions in engagement with respectively the tire rim and the brake drum, said member having peripheral radially outwardly opening air scooping means thereon disposed to scoop air out of the slip stream moving past the wheel in service and to drive air from the inner side of the wheel assembly axially through said chamber, said air scooping means including a curved surface directing air from the radial inward direction to the axial direction.

2. In a vehicle wheel assembly including a brake drum and a wheel structure detachably secured concentric with the brake drum and having a tire rim encircling the brake drum in spaced relation and defining an air chamber between the tire rim and the brake drum, an air circulation promoting member comprising a ring mounted across the inner side of said chamber between the tire rim and the brake drum and including a body in engagement with the tire rim and an axially extending portion extending outwardly from the radially inner edge of the body and having means in engagement with the drum, said body being continuously scalloped around its entire periphery and comprising alternately tire rim engaging axially outer sharply peaked curve portions and axially inwardly curving relatively flat curve portions together forming a continuous undulating generally epicyclic peripheral margin, the axially inwardly curving portions defining radially outwardly opening air scoops.

3. As an article of manufacture an annular brake drum cooling air circulator having a scalloped body, and an axially extending flange at the radially inner edge of said body, said flange having a generally radially inwardly extending flange structure extending from said flange and terminating in a free edge disposed on a diameter only slightly less than the diameter of said flange, said flange and flange structure being adapted for engagement with the brake drum of a wheel assembly with which used and said body being adapted to engage a tire rim of the wheel assembly.

4. As an article of manufacture an annular brake drum cooling air circulator having a scalloped body, and an axially extending flange at the radially inner edge of said body, said flange behind adapted for engagement with the brake drum of the wheel assembly with which used and said body being adapted to engage a tire rim of the wheel assembly, said body being continuously scalloped around its entire periphery and comprising alternate sharp peaked curve portions axially nearer said flange and broad flat well portions axially farther from said flange and axially curving outwardly away from said flange together defining a continuously undulating generally epicycloid body peripheral margin, the broad flat well portions defining radially outwardly opening air scoops.

5. In a vehicle wheel assembly including a brake drum having an annular shoulder providing a generally axially outwardly facing abutment surface and a wheel structure detachably secured concentric with the brake drum and having a tire rim encircling the brake drum in spaced relation and providing an axially inwardly facing abutment surface axially inwardly offset from the brake drum abutment surface, an air circulation promoting member comprising a one-piece ring mounted between the tire rim and the brake drum, said ring comprising a generally radially inwardly extending flange structure of diameter to telescope on said brake drum from the axially outer side thereof and to oppose the generally axially outwardly facing abutment surface provided by said brake drum shoulder, a generally axially extending flange extending from the radially outer margin of said flange structure, and a body portion extending from the axially inner margin of said flange radially outwardly to oppose the axially inwardly facing abutment surface provided by said tire rim, said body portion having a plurality of generally radially outwardly opening air scoops for driving air from the inner side of the wheel assembly through said chamber.

6. In a vehicle wheel assembly including a brake drum having an annular shoulder providing a generally axially outwardly facing abutment surface and a wheel structure detachably secured concentric with the brake drum and having a tire rim encircling the brake drum in spaced relation and providing an axially inwardly facing abutment surface axially inwardly offset from the brake drum abutment surface, an air circulation promoting member comprising a one-piece ring mounted between the tire rim and the brake drum, said ring comprising a generally radially inwardly extending flange structure of diameter to telescope on said brake drum from the axially outer side thereof and to oppose the generally axially outwardly facing abutment surface provided by said brake drum shoulder, a generally axially extending flange extending from the radially outer margin of said flange structure, and a body portion extending from the axially inner margin of said flange radially outwardly to oppose the axially inwardly facing abutment surface provided by said tire rim, said body portion having a plurality of generally radially outwardly opening air scoops for driving air from the inner side of the wheel assembly through said chamber, said generally axially extending flange being of axial extent less than the offset between the brake drum and tire rim abutment surfaces whereby when the ring is telescoped onto a brake drum with its flange against the abutment surface of the brake drum, and a wheel structure is secured with the brake drum, the ring will be placed under tension for snug rattle-free retention between the brake drum and wheel structure.

7. In a vehicle wheel assembly including a brake drum having an annular shoulder providing a generally axially outwardly facing abutment surface and a wheel structure detachably secured concentric with the brake drum and having a tire rim encircling the brake drum in spaced relation and providing an axially inwardly facing abutment surface axially inwardly offset from the brake drum abutment surface, an air circulation promoting member comprising a one-piece ring mounted between the tire rim and the brake drum, said ring comprising a generally radially inwardly extending flange structure of diameter to telescope on said brake drum from the axially outer side thereof and to oppose the generally axially outwardly facing abutment surface provided by said brake drum shoulder, a generally axially extending flange extending from the radially outer margin of said flange structure, and a body portion extending from the axially inner margin of said flange radially outwardly to oppose the axially inwardly facing abutment surface provided by said tire rim, said body portion comprising a continuously scalloped margin including alternately, tire rim engaging axially outer relatively sharply peaked curved portions and axially inwardly curving relatively broad curved portions defining radially outwardly opening air scoops for driving air from the inner side of the wheel assembly through said chamber.

8. As an article of manufacture, an air circulator ring comprising a generally radially extending relatively short flange structure providing a generally axially inwardly facing shoulder for engaging the axially outer face of a brake drum shoulder, a generally axially extending flange and of axial extent generally corresponding to the radial extent of said flange structure functionally integral with the radially outer margin of said flange structure, and an annular body portion functionally integral with the axially inner margin of said flange and extending generally radially outwardly therefrom and of radial extent substantially greater than the radial extent of said flange structure, said body portion providing a generally axially outwardly facing shoulder for engaging the axially inner face of a tire rim and providing a plurality of air directing cups about the periphery thereof.

9. As an article of manufacture for use with a wheel assembly including a brake drum having a shoulder and a tire rim secured to said brake drum an air circulator ring comprising a generally axially extending annular flange, a generally radially inwardly extending flange structure providing a generally axially inwardly facing shoulder for engaging the axially outer face of the brake drum shoulder, and functionally integral with the axially outer margin of said flange, and an annular body portion functionally integral with the axially inner margin of said flange and extending generally radially outwardly therefrom, said body portion providing a generally axially outwardly facing shoulder for engaging an axially inner face of the tire rim and providing a plurality of air directing cups about the periphery thereof, said generally axially extending flange being of axial extent less than the offset between the axially outer engagement face of the brake drum and the tire rim inner face, whereby with the ring telescoped onto the brake drum with its flange against the engagement face of the brake drum, the ring will be under tension for snug rattle-free retention between the brake drum and the tire rim.

10. As an article of manufacture, an air circulator ring comprising a generally axially extending flange, a generally radially inwardly extending flange structure providing a generally axially inwardly facing shoulder for engaging the axially outer face of a brake drum shoulder, and functionally integral with the axially outer margin of said flange, and a body portion functionally integral with the axially inner margin of said flange and extending generally radially outwardly therefrom, said body portion comprising a scalloped margin including axially inwardly extending relatively broad cup portions, and axially outwardly projecting ribs providing generally axially outwardly facing shoulders for engaging a tire rim and interposed at spaced intervals between adjacent scoop portions, said flange structure being of radial extent generally equal to the axial extent of said flange.

11. In a vehicle wheel assembly including a brake drum and a wheel structure detachably secured concentric with the brake drum and having a tire rim encircling the brake drum in spaced relation and defining an air chamber between the tire rim and the brake drum, an air circulation promoting member comprising a ring mounted across said chamber between the tire rim and the brake drum and including radially spaced portions in engagement with respectively the tire rim and the brake drum, said member having a plurality of peripheral radially outwardly opening air directing cups thereon, said air directing cups each including a cupped surface having a generally radially extending radially outer surface portion and a contiguous radially inner generally axially extending surface portion for directing air between a radial direction along said generally radially extending surface portion and an axial direction along said generally axially extending surface portion to circulate air in said chamber, said air circulation promoting member being a distinct and separate structural unit from said brake drum and said wheel structure and being detachably secured therebetween by the engagement of said radially spaced portions of the ring therewith.

References Cited in the file of this patent

UNITED STATES PATENTS

| 2,053,735 | Overholser | Sept. 8, 1936 |
| 2,106,702 | Campbell | Feb. 1, 1938 |
| 2,143,950 | Kliesrath | Jan. 17, 1939 |
| 2,179,656 | Eksergian | Nov. 14, 1939 |
| 2,265,938 | Eksergian | Dec. 9, 1941 |
| 2,331,259 | Whitten | Oct. 5, 1943 |
| 2,489,522 | Chase | Nov. 29, 1949 |
| 2,662,415 | Shields | Dec. 15, 1953 |

FOREIGN PATENTS

| 586,494 | France | Mar. 27, 1925 |